Patented Oct. 29, 1935

2,018,764

UNITED STATES PATENT OFFICE 2,018,764

AZO DYE AND METHOD FOR ITS PREPARATION

Clifford Paine, Handforth, England, assignor to Imperial Chemical Industries Limited, a corporation of Great Britain No Drawing. Application August 23, 1932, Serial No. 630,058. In Great Britain September 4, 1931

20 Claims. (Cl. 260—70)

This invention relates to the preparation of new azo dyestuffs and more particularly refers to the preparation of tetrakisazo dyestuffs having the following general formula:

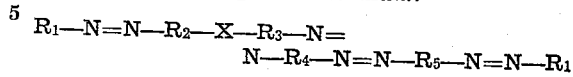

in which $R_1$ represents a "yellow" end component, $R_2$ represents an arylene nucleus which may have substituted thereon a solubilizing group, X represents a carbonyl-amino, amino-carbonyl, amino-sulfo or sulfo-amino group, $R_3$ represents an arylene nucleus which has substituted thereon a solubilizing group in the absence of such a group on the $R_2$ nucleus, $R_4$ represents a para coupling component, and $R_5$ represents an N-substituted J-acid or H-acid having a diazotizable amino group in the N-substituent.

It is an object of this invention to produce dyes which impart to textile materials uniform shades, particularly shades of green which have an attractive appearance and are fast to washing and light. Additional objects will appear hereinafter.

These objects are attained by the process of the present invention wherein a compound of the following general formula:

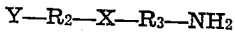

in which Y represents a nitro or mono-acylamino group and the other symbols have the same definition as previously given; is diazotized and coupled with a para coupling component. This azo compound is then diazotized and coupled with an N-substituted J-acid or H-acid, having a diazotizable amino group in the N-substituent. The nitro group or mono-acylamino group is converted to an amino group and the resulting compound tetrazotized and coupled with two equivalents of a "yellow" end component—by "yellow" end component is meant a compound which when coupled with diazotized para amino benzoic acid gives a yellow monoazo compound.

The invention may be more completely understood by reference to the following illustrative examples in which the quantities are stated in parts by weight:

Example 1

The diamino disazo compound used in this example was prepared as follows: 33.5 parts of the sodium salt of p-nitrobenzoyl-p-phenylenediaminesulfonic acid were dissolved in 2,000 parts of hot water at a temperature of 70° C., 38 parts of hydrochloric acid (sp. gr. 1.16) were added. The suspension was cooled to 15° C. and diazotized with 35.0 parts of 20% aqueous sodium nitrite solution. The suspension of the diazo compound was then neutralized to Congo red indicator by the addition of sodium acetate, and a solution of 28.9 parts of the sodium salt of 1-amino-2-ethoxynaphthalene-6-sulfonic acid in 600 parts of water was slowly added. Coupling was completed in 6 hours. The suspension of the monoazo compound was then made alkaline to litmus by the addition of aqueous caustic soda and finally warmed to 30° C. 35 parts of a 20% solution of sodium nitrite were then added, followed by 76 parts of hydrochloric acid (sp. gr. 1.16). After stirring 2 hours the diazo-azo compound was salted out, filtered and the paste added gradually to a solution of 39.1 parts of the sodium salt of 2 - p-aminobenzoylamino - 5 - hydroxy - naphthalene-7-sulfonic acid in 150 parts water, 40 parts of pyridine and 10.0 parts aqueous ammonia (sp. gr. 0.880) at a temperature below 5° C. The disazo compound so obtained was filtered off. It was then dissolved in 4,000 parts water at 60° C. and the nitro group reduced by adding 25.0 parts of sodium sulfide crystals dissolved in 250 ccs. water and stirring at 30° C. for 3 hours. The diamino compound was isolated by salting out and filtration.

(a) *Production of a new dystuff in substance*

The above obtained paste of the diamino disazo compound was redissolved in 4,000 parts of hot water, cooled to 0° C. and 63 parts of 20% aqueous sodium nitrite solution added, followed by 68.4 parts of hydrochloric acid (sp. gr. 1.10). Tetrazotization was allowed to proceed for 1 hour. The tetrazo compound thus obtained was coupled by adding it slowly to a solution of 50 parts of 1-(4'-sulfophenyl)-3-methyl-5-pyrazolone in 400 parts of water containing 8.0 parts of sodium hydroxide and 100 parts of sodium carbonate ($Na_2CO_3$). Coupling was immediate and the new tetrakisazo dyestuff was isolated by the addition of salt followed by filtration and drying in the usual way. The new dyestuff dyed cotton from an alkaline bath clear, yellowish-green shades. The new dyestuff has the following probable formula:

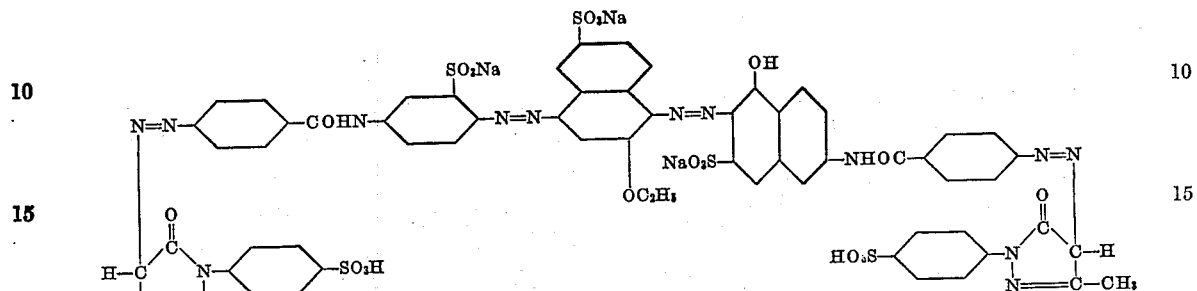

(b) *Production of the new dyestuff on the fiber*

A hank of 50 gms. of cotton yarn was dyed from a faintly alkaline bath in the customary manner with 2.0 gms. of the diamino disazo compound described above. It was then immersed in 500 ccs. of water to which had been added 3.0 ccs. of hydrochloric acid (sp. gr. 1.16) and 20 gms. of ice. 5.0 ccs. of 20% aqueous sodium nitrite solution were then added to the bath. After working the yarn in this bath for ½ hour it was removed, rinsed with water and developed for ½ hour in a solution of 2.0 gms. of aceto-acetyl-o-chloraniline in 500 ccs. of water and 10 ccs. of 10% aqueous caustic soda and finally washed in water and dried. The resulting dyeing was of a clear bluish-green shade with excellent fastness properties.

The new dyestuff has the following probable formula:

acid (sp. gr. 1.16) was then added to the suspension of diazo compound. Any mineral acidity of the mixture was neutralized by further addition of sodium acetate, and coupling was allowed to proceed to completion. The mono-azo compound thus formed was separated by the addition of common salt, filtered off and the precipitate was redissolved in 750 parts of water and 10 parts of 40% aqueous caustic soda. The temperature of the solution was adjusted to 30° C., 35.0 parts of 20% sodium nitrite solution were added, followed by 40 parts of hydrochloric acid (sp. gr. 1.16). Diazotization was substantially complete in 2 hours, when 150 parts of common salt were added and the separated diazo-azo compound was filtered off. The so-obtained paste of diazo-azo compound was added in small amounts to 39.1 parts of the sodium salt of 2-p-aminobenzoylamino-5-hydroxy-naphthalene-7-sulfonic acid dissolved in 100 parts of water, 40 parts of pyridine and 10.0 parts of aqueous ammonia (sp. gr. 0.880) at a temperature below 5° C. The new nitroaminodisazo compound was filtered off, purified if necessary, by re-salting from an aqueous solution, further dissolved in 500 parts of water, and a solution of 20 parts of sodium sulfide crystals in 100 parts of water was added at a temperature of 25° C. The reduction was continued at this temperature for 24 hours when the diamino disazo compound was isolated by gradual addition of acetic acid, followed by filtration. The so-obtained new disazo dyestuff dyed cotton from a faintly alkaline bath in greenish-blue shades. Tetrazotized on the fiber and then developed with phenylmethylpyrazolone in the customary manner, it yielded yellowish-green shades of good fastness.

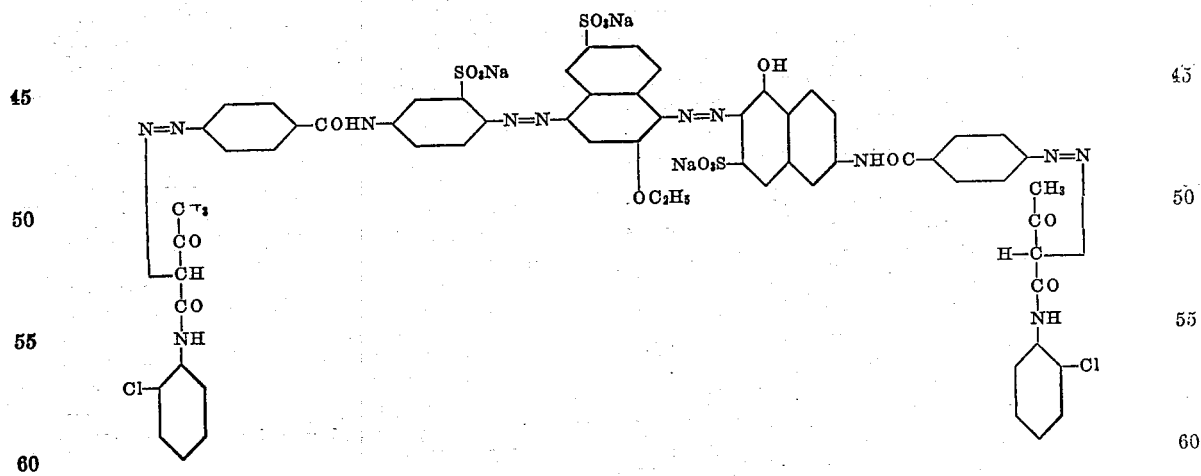

*Example 2*

37.1 parts of the sodium salt of 1-amino-4(3'-nitrobenzenesulfonylamino) benzene-2-sulfonic acid were dissolved in 600 parts of water; 35.0 parts of 20% aqueous sodium nitrite solution were then added, followed, at a temperature of 0–5° C. by 38 parts of hydrochloric acid (sp. gr. 1.16). Diazotization was allowed to proceed for 1 hour, the suspension of the diazo compound was then neutralized to Congo red indicator by the addition of sodium acetate. A solution of 15.3 parts of 1-amino-2:5-dimethoxybenzene in 500 parts of water and 14 parts of hydrochloric The new dyestuff has the following probable formula:

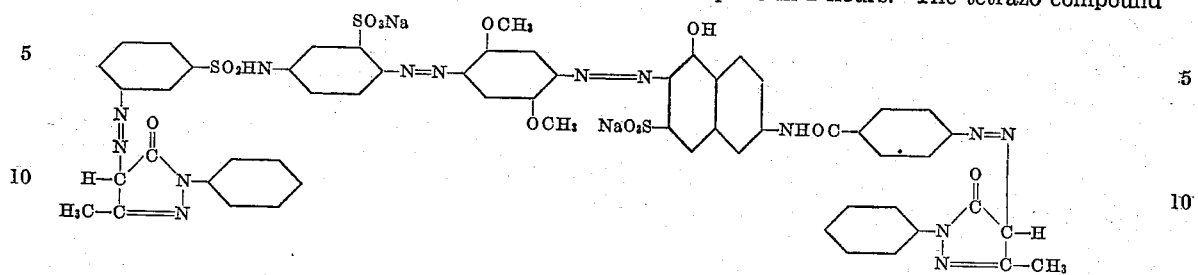

Example 3

40.8 parts of the sodium salt of 1-amino-4(3'-acetyl-aminobenzene-sulfonylamino) benzene-2-sulfonic acid were dissolved in 500 parts of water at 0–5° C., 35.0 parts of 20% aqueous sodium nitrite solution were then added, followed by 38 parts of hydrochloric acid (sp. gr. 1.16). Diazotization was allowed to proceed for 2 hours. The suspension of diazo compound was then slowly added to a solution of 24.5 parts of the sodium salt of 1-naphthylamine-7-sulfonic acid in 500 parts of water containing also 28 parts of crystallized sodium acetate. Coupling was allowed to proceed for 8 hours at 5–10° C. when the mono-azo compound was isolated by the addition of salt, followed by filtration. The precipitate was dissolved at 30° C. in 600 parts of water and 10 parts of 40% aqueous caustic soda, 35.0 parts of 20% aqueous sodium nitrite solution were added, followed by 40 parts of hydrochloric acid (sp. gr. 1.16). Diazotization was substantially complete in 2½ hours, when 120 parts of common salt were added and the diazo-azo compound was filtered off. The paste obtained was made into a smooth cream with 200 parts of ice-cold water and added to an ice-cold solution of 46.0 parts of the sodium salt of 1 - p - aminobenzoylamino - 8 - hydroxy - naphthalene-3:6-disulfonic acid in 100 parts of water and 48.0 parts of aqueous ammonia (sp. gr. 0.880). The acetyl-aminodisazo compound was isolated by the addition of common salt followed by filtration. The new compound was dissolved in 500 parts of 7% sodium hydroxide and heated at 90–95° C. for 1½ hours. The hydrolyzed diamino-disazo compound was then isolated by neutralizing to brilliant yellow indicator with hydrochloric acid at 20° C., adding 60 parts of common salt and filtering. The diamino-disazo compound was dissolved in 400 parts of water at 0° C., 60 parts of 20% aqueous sodium nitrite solution were added, followed by 68.0 parts of hydrochloric acid (sp. gr. 1.16). Tetrazotization was complete in 2 hours. The tetrazo compound was added to a solution of aceto-acet-anilide prepared by dissolving 34 parts of the anilide in 200 parts of water containing 8.0 parts of sodium hydroxide and 100 parts of anhydrous sodium carbonate. Coupling was immediate and the new tetrakisazo dyestuff was isolated by adding salt and filtering. It dyed cotton from an alkaline bath yellowish-green shades.

The new dyestuff has the following probable formula:

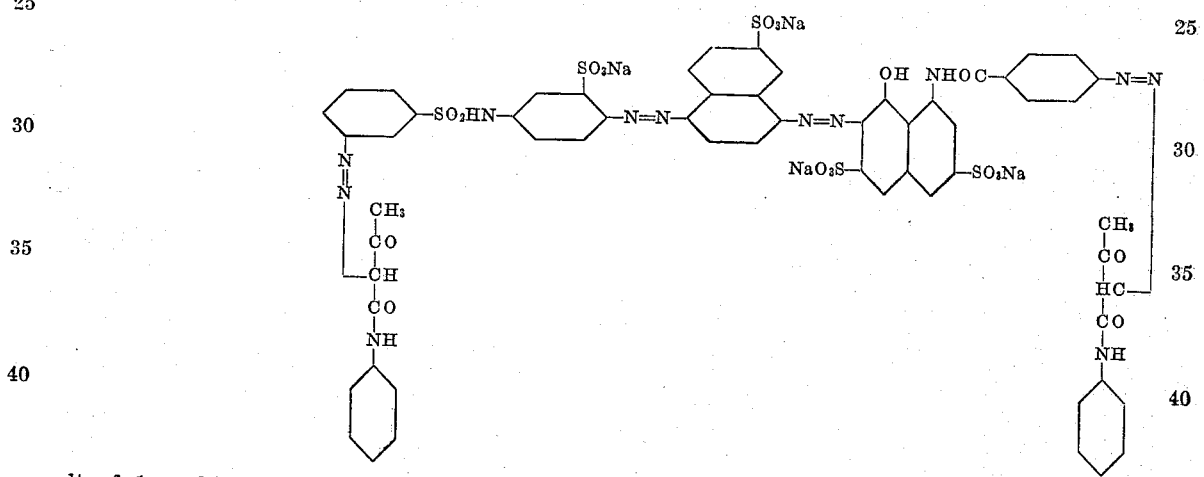

The conditions and the compounds used in the above examples may be varied within rather wide limits without departing from the scope of the present invention. For instance, any of the other para coupling components, a few of which are meta-toluidine, 3-amino-p-cresol methyl ether, 2-5 - dimethoxy - aniline, alpha-naphthylamine, 1-amino-2-naphthol ethyl ether, Cleve's acids and their 2-alkoxy-derivatives, may be substituted in the examples given with excellent results. The diazo compound with which this para coupling component is coupled should contain a solubilizing group on one of the arylene nuclei. For this purpose the sulfonic acid group gives the best results, and it is preferably substituted on that arylene nucleus which is doubly combined with nitrogen.

The amino group of the para coupling component is diazotized and coupled with an N-substituted J-acid or H-acid having a diazotizable amino group in the N-substituent. For this N-substituent the para-amino-benzoyl radical has been found very satisfactory. However, the invention is not limited to a J-acid or H-acid having a para-amino-benzoyl radical substituted on the amino group, since other radicals containing a diazotizable amino group might also be used with good results. This diazotizable amino group need not be in the para position on the radical as a diazotizable amino group in the ortho or meta position could also be used. This radical might also have substituted thereon other groups which do not prevent coupling from taking place without impairing the properties of the resulting compound.

The nitro or mono-acyl-amino group may be converted to the amino group by any of the well known methods, examples of which are reducing with sodium sulfide or treating with sodium hydroxide, respectively. These are merely representative examples of processes for converting nitro and mono-acyl-amino groups to amino groups and are not intended as a limitation of the present invention, since many other processes for accomplishing the same result may be used with equal efficacy.

The disazo-diamino compound is then coupled with a "yellow" end component which term is merely used to define a compound which when coupled with diazotized para-amino-benzoic acid gives a yellow dye. Examples of a few of the compounds which come within this description are aceto-acetyl-arylamines, 2-4-dihydroxy-quinoline, methyl ketol, salicylic acid, resorcinol and various pyrazolone derivatives.

The carbonyl-amino and sulfo-amino "chromophoric block" present in the compounds described herein produces colors of pronounced superiority over compounds having related structures but which do not contain this "chromophoric block". This superiority is particularly noticed in the increased yellowness of shade of the products mentioned.

The tetrakisazo dyes falling within the scope of this invention impart attractive uniform colors, particularly shades of greenish-yellow to cotton and other textile materials. These shades have excellent stability to washing and light.

As many apparently widely different embodiments of this invention may be made without departing from the spirit and scope thereof, it is to be understood that I do not limit myself to the specific embodiments thereof except as defined in the appended claims.

I claim:

1. A process for producing azo dyes which comprises coupling a diazotized amine of the following general formula:

$$Y—R_2—X—R_3—NH_2$$

wherein Y represents a nitro or mono-acyl-amino group, $R_2$ and $R_3$ represent arylene nuclei at least one of which has substituted thereon a sulfonic acid group, and X represents a carbonyl-amino or sulfo-amino group, with an aromatic amine, diazotizing the resulting aminoazo compound and coupling it with an N-substituted amino-naphthol-sulfonic acid having a diazotizable amino group in the N-substituent, converting the nitro or mono-acyl-amino group of the initial component to an amino group, then tetrazotizing the resulting compound and coupling it with two equivalents of a "yellow end component".

2. A process for producing azo dyes which comprises coupling a diazotized amine of the following general formula:

$$Y—R_2—X—R_3—NH_2$$

wherein Y represents a nitro or mono-acyl-amino-group, $R_2$ and $R_3$ represent arylene nuclei of the benzene series at least one of which has substituted thereon a sulfonic acid group, and X represents a carbonyl-amino or sulfo-amino group, with an aromatic amine which couples in the position para to the amino group, diazotizing the resulting aminoazo compound and coupling it with an N-substituted amino-naphthol-sulfonic acid having a diazotizable amino group in the N-substituent, converting the nitro or mono-acyl-amino group of the initial component to an amino group, then tetrazotizing the resulting compound and coupling it with two equivalents of a "yellow end component".

3. A process for producing azo dyes which comprises coupling a diazotized amine of the following general formula:

$$Y—R_2—X—R_3—NH_2$$

wherein Y represents a nitro or mono-acyl-amino group, $R_2$ and $R_3$ represent arylene nuclei of the benzene series at least one of which has substituted thereon a sulfonic acid group, and X represents a carbonyl-amino or sulfo-amino group, with an aromatic amine which couples in the position para to the amino group, diazotizing the resulting aminoazo compound and coupling it with an amino-benzoyl-amino-naphthol-sulfonic acid, converting the nitro or mono-acyl-amino group of the initial component to an amino group, then tetrazotizing the resulting compound and coupling it with two equivalents of a "yellow end component".

4. A process for producing azo dyes which comprises coupling a diazotized amine of the following general formula:

$$Y—R_2—XNH—R_3—NH_2$$

wherein Y represents a nitro or mono-acyl-amino group, $R_2$ and $R_3$ represent arylene nuclei of the benzene series, the latter having substituted thereon a sulfonic acid group, and X represents a carbonyl or sulfonyl group, with an aromatic amine of the benzene or naphthalene series which couples in the position para to the amino group, diazotizing the resulting aminoazo compound and coupling it with an amino-benzoyl-amino-naphthol-sulfonic acid, converting the nitro or mono-acyl-amino group of the initial component to an amino group, then tetrazotizing the resulting compound and coupling it with two equivalents of a "yellow end component".

5. The process of claim 4 wherein the yellow end component is an acyl-acet-arylide.

6. The process of claim 4 wherein the yellow end component is an acetyl-acet-anilide.

7. The process of claim 4 wherein the yellow end component is a phenyl-methyl-pyrazolone.

8. A process for producing an azo dye which comprises coupling diazotized p-nitrobenzoyl-p-phenylene-diamine-sulfonic acid with 1-amino-2-ethoxy-naphthalene-6-sulfonic acid, diazotizing the resulting amino-azo compound and coupling it with 2-p-amino-benzoylamino-5-hydroxy-naphthalene-7-sulfonic acid, converting the nitro group to an amino group, tetrazotizing the resulting compound and coupling it with 1-4'-sulfophenyl-3-methyl-5-pyrazolone.

9. A process for producing an azo dye which comprises coupling diazotized 1-amino-4-(3'-nitrobenzene-sulfonylamino)-benzene-2-sulfonic acid with 1-amino-2-5-dimethoxy-benzene, diazotizing the resulting amino-azo compound and coupling it with 2-p-aminobenzoylamino-5-hydroxy-naphthalene-7-sulfonic acid, converting the nitro group to an amino group, tetrazotizing the resulting compound and coupling it with phenyl-methyl-pyrazolone.

10. A process for producing an azo dye which comprises coupling diazotized 1-amino-4-(3' acetyl-amino-benzene-sulfonylamino)-benzene-2-sulfonic acid with 1-naphthylamine-7-sulfonic acid, diazotizing the resulting amino-azo compound and coupling it with 1-p-amino-benzoyl-amino-8-hydroxy-naphthalene - 3 - 6 - disulfonic acid, converting the acetyl-amino group to an amino group, tetrazotizing the resulting compound and coupling it with aceto-acet-anilide.

11. Azo dyes having the following general formula:

$$R_1-N=N-R_2-X-R_3-N=N-R_4-N=N-R_5-N=N-R_1$$

wherein $R_1$ represents the radical of a "yellow end component", $R_2$ and $R_3$ represent arylene nuclei at least one of which has substituted thereon a sulfonic acid group, X represents a carbonyl-amino or sulfo-amino group, $R_4$ represents the radical of an aromatic amine, and $R_5$ represents the radical of an N-substituted-amino-naphthol-sulfonic acid.

12. Azo dyes having the following general formula:

$$R_1-N=N-R_2-X-R_3-N=N-R_4-N=N-R_5-N=N-R_1$$

wherein $R_1$ represents the radical of a "yellow end component", $R_2$ and $R_3$ represent arylene nuclei of the benzene series at least one of which has substituted thereon a sulfonic acid group, X represents a carbonyl-amino or sulfo-amino group, $R_4$ represents the radical of an aromatic amine which couples in the position para to the amino group, and $R_5$ represents the radical of an N-substituted-amino-naphthol-sulfonic acid.

13. Azo dyes having the following general formula:

$$R_1-N=N-R_2-X-R_3-N=N-R_4-N=N-R_5-N=N-R_1$$

wherein $R_1$ represents the radical of a "yellow end component", $R_2$ and $R_3$ represent arylene nuclei of the benzene series at least one of which has substituted thereon a sulfonic acid group, X represents a carbonyl-amino or sulfo-amino group, $R_4$ represents the radical of an aromatic amine which couples in the position para to the amino group, and $R_5$ represents the radical of an amino-benzoyl-amino-naphthol-sulfonic acid.

14. Azo dyes having the following general formula:

$$R_1-N=N-R_2-XNH-R_3-N=N-R_4-N=N-R_5-N=N-R_1$$

wherein $R_1$ represents the radical of a "yellow end component", $R_2$ and $R_3$ represent arylene nuclei of the benzene series the latter having substituted thereon a sulfonic acid group, X represents a carbonyl or sulfonyl group, $R_4$ represents the radical of an aromatic amine of the benzene or naphthalene series which couples in the position para to the amino group, and $R_5$ represents the radical of an amino-benzoyl-amino-naphthol-sulfonic acid.

15. The product of claim 13 wherein the component represented by $R_1$ is the radical of an acyl-acet-arylide.

16. The product of claim 13 wherein the component represented by $R_1$ is the radical of an acetyl-acet-anilide.

17. The product of claim 13 wherein the component represented by $R_1$ is the radical of a phenyl-methyl-pyrazolone.

18. An azo dye having the following formula:

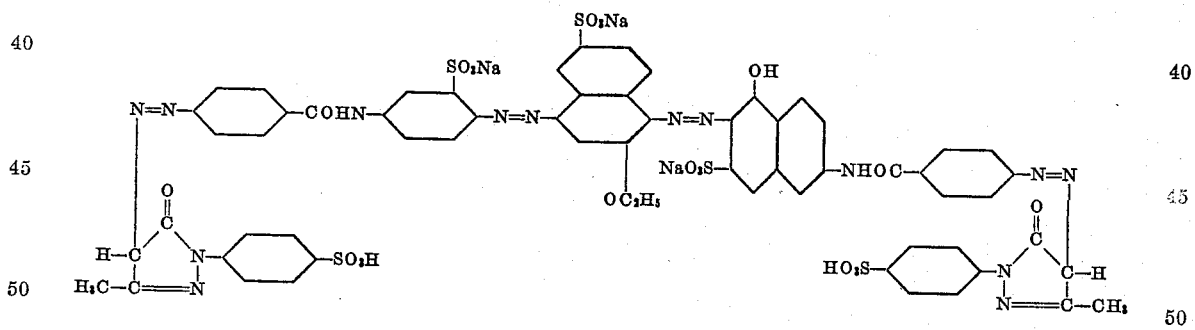

19. An azo dye having the following formula:

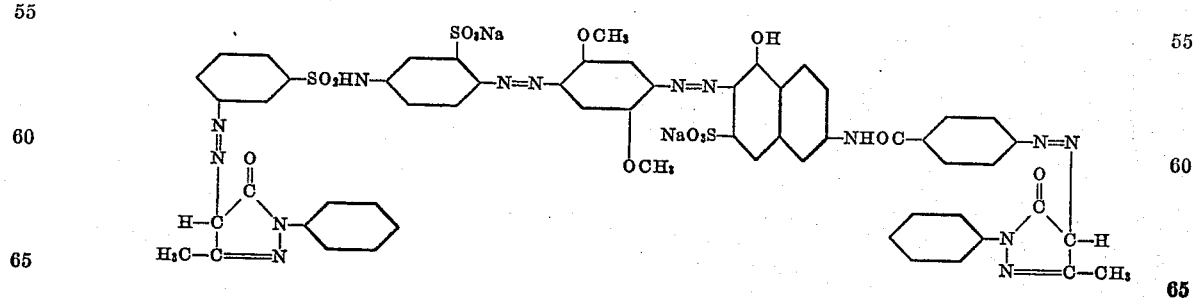

20. An azo dye having the following formula:
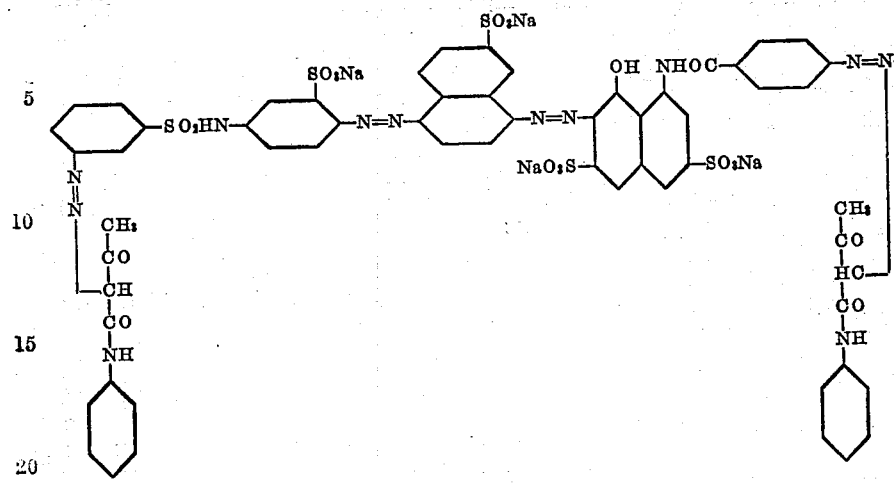
CLIFFORD PAINE.